(12) United States Patent
Panuganty et al.

(10) Patent No.: US 9,246,765 B2
(45) Date of Patent: Jan. 26, 2016

(54) APPARATUS AND METHODS FOR AUTO-DISCOVERY AND MIGRATION OF VIRTUAL CLOUD INFRASTRUCTURE

(71) Applicant: Cognizant Business Services Limited, Jersey (GB)

(72) Inventors: Ramesh Panuganty, Cupertino, CA (US); Bideep Bezbaruah, Bangalore (IN)

(73) Assignee: COGNIZANT BUSINESS SERVICES LIMITED, Jersey (GB)

( * ) Notice: Subject to any disclaimer, the term of this patent is extended or adjusted under 35 U.S.C. 154(b) by 251 days.

(21) Appl. No.: 13/922,621

(22) Filed: Jun. 20, 2013

(65) Prior Publication Data

US 2013/0346619 A1  Dec. 26, 2013

Related U.S. Application Data (60) Provisional application No. 61/746,764, filed on Dec. 28, 2012, provisional application No. 61/662,091, filed on Jun. 20, 2012.

(51) Int. Cl.
*G06F 15/16* (2006.01)
*G06F 15/173* (2006.01)
*H04L 12/24* (2006.01)

(52) U.S. Cl.
CPC ............ *H04L 41/12* (2013.01); *H04L 41/0856* (2013.01); *H04L 41/0866* (2013.01)

(58) Field of Classification Search
USPC ......................................................... 709/226
See application file for complete search history.

(56) References Cited

U.S. PATENT DOCUMENTS

| | | | |
|---|---|---|---|
| 7,797,453 B2 | 9/2010 | Meijer et al. | |
| 8,014,308 B2 | 9/2011 | Gates, III et al. | |
| 8,271,974 B2 | 9/2012 | Mazhar et al. | |
| 8,499,075 B2 * | 7/2013 | Maenpaa | 709/224 |
| 8,612,599 B2 * | 12/2013 | Tung et al. | 709/226 |
| 8,631,099 B2 * | 1/2014 | Morgan | 709/220 |
| 8,751,650 B2 * | 6/2014 | Mittal et al. | 709/225 |
| 8,769,644 B1 * | 7/2014 | Eicken et al. | 726/5 |
| 8,782,192 B2 * | 7/2014 | Morgan | 709/223 |
| 8,799,453 B2 * | 8/2014 | Cahill et al. | 709/224 |

(Continued)

OTHER PUBLICATIONS

Tordsson, Johan et al. "Cloud Brokering Mechanisms for Optimized Placement of Virtual Machines across Multiple Providers," Future Generation Computer Systems, vol. 28, Jul. 2011, pp. 358-367.*

(Continued)

*Primary Examiner* — Melvin H Pollack
(74) *Attorney, Agent, or Firm* — Rothwell, Figg, Ernst & Manbeck, P.C.

(57) ABSTRACT

A system, method, and medium are disclosed for auto discovery and migration of virtual cloud infrastructure. The system includes a configuration database that stores managed entity attributes. The system includes a services console that is configured to retrieve entity attributes from one or more cloud providers. The services console is further configured to compare the managed entity attributes and the retrieved entity attributes. The comparison includes determining if the managed entity attributes correspond to the retrieved entity attributes. The services console is further configured to store, based on the comparison, updated entity attributes in the configuration database. The system also includes a management console configured to generate an architectural view of the updated entity attributes.

18 Claims, 8 Drawing Sheets

(56) References Cited

U.S. PATENT DOCUMENTS

| | | | |
|---|---|---|---|
| 8,909,784 B2* | 12/2014 | Ferris et al. | 709/226 |
| 8,924,569 B2* | 12/2014 | Li | 709/227 |
| 8,984,505 B2* | 3/2015 | Ferris | 718/1 |
| 9,043,751 B2 | 5/2015 | Mazhar et al. | |
| 2013/0232497 A1* | 9/2013 | Jalagam et al. | 718/104 |
| 2013/0326050 A1* | 12/2013 | Halabi | 709/224 |
| 2014/0052877 A1* | 2/2014 | Mao | 709/245 |
| 2014/0297868 A1* | 10/2014 | Ennaji et al. | 709/226 |
| 2015/0006733 A1* | 1/2015 | Khan et al. | 709/226 |
| 2015/0040125 A1* | 2/2015 | Anderson et al. | 718/1 |
| 2015/0074279 A1* | 3/2015 | Maes et al. | 709/226 |

OTHER PUBLICATIONS

Ardagna, Danilo et al. "MODAClouds: A Model-Driven Approach for the Design and Execution of Applications on Multiple Clouds," Proceedings of the 4th Intl Workshop on Modeling in Software Engineering (MISE), Jun. 2012, pp. 50-56.*

Rochwerger, B. et al. "The Reservoir Model and Architecture for Open Federated Cloud Computing," IBM Journal of Research and Development, vol. 53, Issue 4, Jul. 2009, pp. 4:1-4:11.*

Buyya, Rajkumar et al. "Cloud Computing and Emerging IT Platforms: Vision, Hype, and Reality for Delivering Computing as the 5th Ultility," Future Generation Computer Systems, vol. 25, Dec. 2008, pp. 599-616.*

Buvya, R., et al., "Market-Oriented Cloud Computing: Vision, Hype, and Reality for Delivering IT Services as Computing Utilities," GRIDS Laboratory, Dept. of Computer Science and Software Engineering, The Univ. of Melbourne, Australia, 9 pages, appears in 10th IEEE Conference on High Performance Computing and Communications, 2008, HPCC '08, Sep. 2008.

Calheiros, R. N., et al., "CloudSim: A Tookit for the Modeling and Simulation of Cloud Resource Management and Application Provisioning Techniques," Software: Practice and Experience, 41(1):23-50, Wiley, Jan. 2011, http://dx.doi.org/10.1002/spe.995; 23 pages.

Urgaonkar, B., et al., "Agile Dynamic Provisioning of Multi-Tier Internet Applications," ACM Transactions on Autonomous and Adaptive Systems, vol. 3, No. 1, Article 1, Mar. 2008, 39 pages.

Vazquez, C., et al., "Dynamic Provision of Computing Resources from Grid Infrastructures and Cloud Providers," IEEE Computer Society, 2009 Workshops at the Grid and Pervasive Computing Conference, pp. 113-120.

Henderson, N., "Amazon Launches AWS Marketplace for One-Click Cloud App Deployment," Apr. 19, 2012, 7 pages, http://www.thewhir.com/web-hosting-news/amazon-launches-aws-market.

Right Scale, Cloud Management Automation Engine, http://www.rightscale.com/products/automation-engine.php, 11 pages, initially accessed Aug. 7, 2012.

Right Scale, Cloud Management MultiCloud Platform, http:/www.rightscale.com/products/multi-cloud-platform.php, 10 pages., initially accessed Aug. 7, 2012.

UC Grid Portal, Home page, https://portal.ucgrid.org/gridsphere/gridsphere, 2 pages, 2006.

Appleby, K., et al. "Oceano—SLA Based Management of a Computing Utility," Integrated Network Management Proceedings, 2001 IEEE/IFIP International Symposium, Seattle, WA, May 14-18, 2001, DOI 10.1109/INM.2001.918085, 14 pages.

Martin, J., Design and Strategy for Distributed Data Processing, Englewood Cliffs, NJ: Prentice-Hall, Inc., 1981, 644 pages.

Opening Brief in Support of Defendants' Rule 12(b)(6) Motion to Dismiss for Failure to Allege Infringement of a Patentable Claim Under 35 U.S.C. § 101; *Kaavo Inc.* v. *Appfog, et al.*; C.A. No. 1:14-01193-LPS-CJB; Filed Feb. 2, 2015, Dist. DE; 24 pages.

Opening Brief in Support of Defendants' Rule 12(b)(6) Motion to Dismiss for Failure to Allege Infringement of a Patentable Claim Under 35 U.S.C. § 101; *Kaavo Inc.* v. *Appfog, et al.*; C.A. No. 14-1193-LPS-CJB; Filed Dec. 19, 2014, Dist. DE; 26 pages.

Motion of Defendant Cognizant Technology Solutions Corporation Under Fed. R. Civ. P. 12(c) for Judgment on the Pleadings Pursuant to 35 U.S.C. § 101; *Kaavo Inc.* v. *Cognizant Technology Solutions Corporation*; C.A. No. 14-1192 (LPS); Filed Feb. 3, 2015; Dist. DE; 6 pages.

Complaint in *Kaavo Inc.* v. *Cognizant Technology Solutions Corporation*, C.A. No. 99-mc-09999, filed Jul. 24, 2015 in the U.S. District Court for the District of Delaware, 34 pages.

* cited by examiner

APPARATUS AND METHODS FOR AUTO-DISCOVERY AND MIGRATION OF VIRTUAL CLOUD INFRASTRUCTURE

PRIORITY CLAIM AND CROSS-REFERENCE TO RELATED APPLICATIONS

The present application claims priority to U.S. Provisional Patent Application Ser. No. 61/662,091, filed Jun. 20, 2012, and U.S. Provisional Patent Application Ser. No. 61/746,764, filed Dec. 28, 2012, both of which are hereby incorporated by reference in their entirety.

BACKGROUND

Increasingly, network applications and services are deployed on "cloud" infrastructures. In many cloud infrastructures, a third-party "cloud provider" owns a large pool of physical hardware resources (e.g., networked servers, storage facilities, computational clusters, etc.) and leases those hardware resources to users for deploying network applications and/or services.

Rather than leasing the hardware resources directly, the cloud provider often allows clients to specify and lease "virtual machines" that match the client's specifications. The virtual machines are then deployed on the cloud-provider's hardware resources. The underlying hardware resources implementing the cloud are therefore invisible to the client, who sees only the virtual machines.

Cloud infrastructures enable many benefits both for the software administrators and for the hardware owners (i.e., cloud providers). Software administrators can specify and lease computing resources (i.e., virtual machines) matching their exact specifications without up-front hardware purchase costs. The administrators can also modify their leased resources as application requirements and/or demand changes. Hardware owners (i.e., cloud providers) also realize substantial benefits from cloud infrastructures. The provider can maximize hardware utilization rates by hosting multiple virtual machines on a single physical machine without fear that the applications executing on the different machines may interfere with one another. Furthermore, the ability to easily migrate virtual machines between physical machines decreases the cloud provider's hardware maintenance costs. For these reasons, even large companies that own substantial hardware resources (e.g., search engine companies, social networking companies, e-commerce companies, etc.) often deploy those hardware resources as private clouds.

Today, many network applications and services are hosted on cloud infrastructures. For example, Internet startups often deploy their web applications on cloud infrastructures rather than purchase hardware, IT departments use cloud infrastructures to deploy various IT services (such as email, social networking, backup storage, etc.), and web giants deploy their own hardware resources as private clouds.

As the demand for cloud computing has grown, so has the number of cloud computing providers. Different providers often offer different qualities of service, different pricing, and/or other distinctive features that make those particular providers more desirable for one purpose or another. Accordingly, some organizations lease resources from multiple providers and may choose to manage the multiple provider resources through a single multi-cloud management system.

However, it may be difficult to discover and migrate a client's virtual cloud infrastructure, which may be spread across multiple providers, to a multi-cloud management system. For example, when a user on-boards a multi-cloud management system, there is always the possibility that the customer has prior computing instances on a provider platform that must be discovered by and migrated to the multi-cloud management system. However, the discovery and migration of such existing virtual cloud infrastructure information may be a challenge for multi-cloud management systems, often requiring a manual process.

SUMMARY

Aspects of the invention are embodied in a system, method, and medium for auto discovery and migration of virtual cloud infrastructure. The system includes a configuration database that stores managed entity attributes. The system includes a services console that is configured to retrieve entity attributes from one or more cloud providers. The services console is further configured to compare the managed entity attributes and the retrieved entity attributes. The comparison includes determining if the managed entity attributes correspond to the retrieved entity attributes. The services console is further configured to store, based on the comparison, updated entity attributes in the configuration database. The system also includes a management console configured to generate an architectural view of the updated entity attributes.

In some embodiments, the services console is further configured to store the retrieved entity attributes in the configuration database, update the managed entity attributes stored in the configuration database with the retrieved entity attributes, and/or delete the managed entity attributes stored in the configuration database based on the retrieved entity attributes.

In some embodiments, the managed entity attributes and the retrieved entity attributes include information about one or more services running on the entity.

In some embodiments, the service console is further configured to identify services running on each entity based on the retrieved entity attributes. The service console is further configured to associate each of the identified services with one or more instance profiles. The service console is further configured to map the instance profiles associated with the identified services to an application profile. The services console is further configured to store, in the configuration database, the associated instance profiles and mapped application profiles for each of the identified services running on each entity.

In some embodiments, the application profiles include configuration and conversion rules to migrate an application to a target cloud provider.

In some embodiments, the architectural view includes a topology that is displayed in a graphical user interface and depicts the managed entities and associated infrastructure and network elements.

In some embodiments, the service console is configured to migrate the full or partial topology to other resources or cloud providers based on user actions to the topology.

In some embodiments, the management console is configured to define a new application based on user actions to the topology.

In some embodiments, the service console is further configured to use investigative techniques to retrieve entity attributes from one or more providers. The investigate techniques include one or more of using login credentials for one or more providers, scanning ports left open by virtual machines, and transmitting communications to virtual machines to which only a particular operating system is receptive.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

As the number of clouds and cloud-deployed applications and services being used by organizations has grown, so too has the difficulty of managing those deployments. An entity may rely on applications across multiple platform providers. For example, a single organization may have many network applications and services, which may be deployed at multiple different providers. Accordingly, a single system may be desirable to manage cloud applications across multiple provider environments. Such a multi-cloud management system is described in U.S. patent application Ser. No. 13/747,724, filed Jan. 23, 2013, which is incorporated in its entirety herein by reference.

However, when such a multi-cloud management system on-boards a new customer, there is always a possibility of the customer having prior computing instances with a provider. Therefore, a multi-cloud management system must reasonably discover these computing instances and infrastructure, thereby enabling operations on them. Without such discovery, a user would need to start from scratch in re-building and identifying the provider infrastructure in the multi-cloud management system. However, the discovery and migration of existing infrastructure information into a multi-cloud management application is a challenge. Furthermore, the discovery and migration of prior computing instances often requires a manual process, which may be tedious and time-consuming.

According to various embodiments, a system may provide facilities for automatically migrating and updating infrastructure information data within a multi-cloud management application. Such an auto-discovery and migration system may enable operations on a user's various computing instances via a multi-cloud management system. According to some embodiments, the system may be used as a component of a multi-cloud management application as part of the on-boarding process for a client.

In other embodiments, the system may be used on an ongoing basis as part of a multi-cloud management platform. Auto discovery and migration of computing instances on an ongoing basis may be desirable when, for example, an action is carried on outside of the multi-cloud management platform, such as the addition or deletion of an instance. Thus, executing the system on an ongoing basis may be desirable for the purpose of managing multiple provider platforms and infrastructure in a multi-cloud management application.

Such an auto-discovery and migration system of provider infrastructure provides several benefits. First, in some embodiments, the system may automate the provider infrastructure migration into a multi-cloud management platform for cloud management. Second, in other embodiments, the only details a new user may need to provide for auto-discovery of the cloud infrastructure are the login credentials for each provider. Third, in additional embodiments, the system may run on a scheduled update mechanism in order to update any incremental differences in the provider infrastructure. Fourth, in some embodiments, a user or administrator can initiate a sync of the provider infrastructure with the multi-cloud management platform at any given point by initiating the system.

Figure 1:
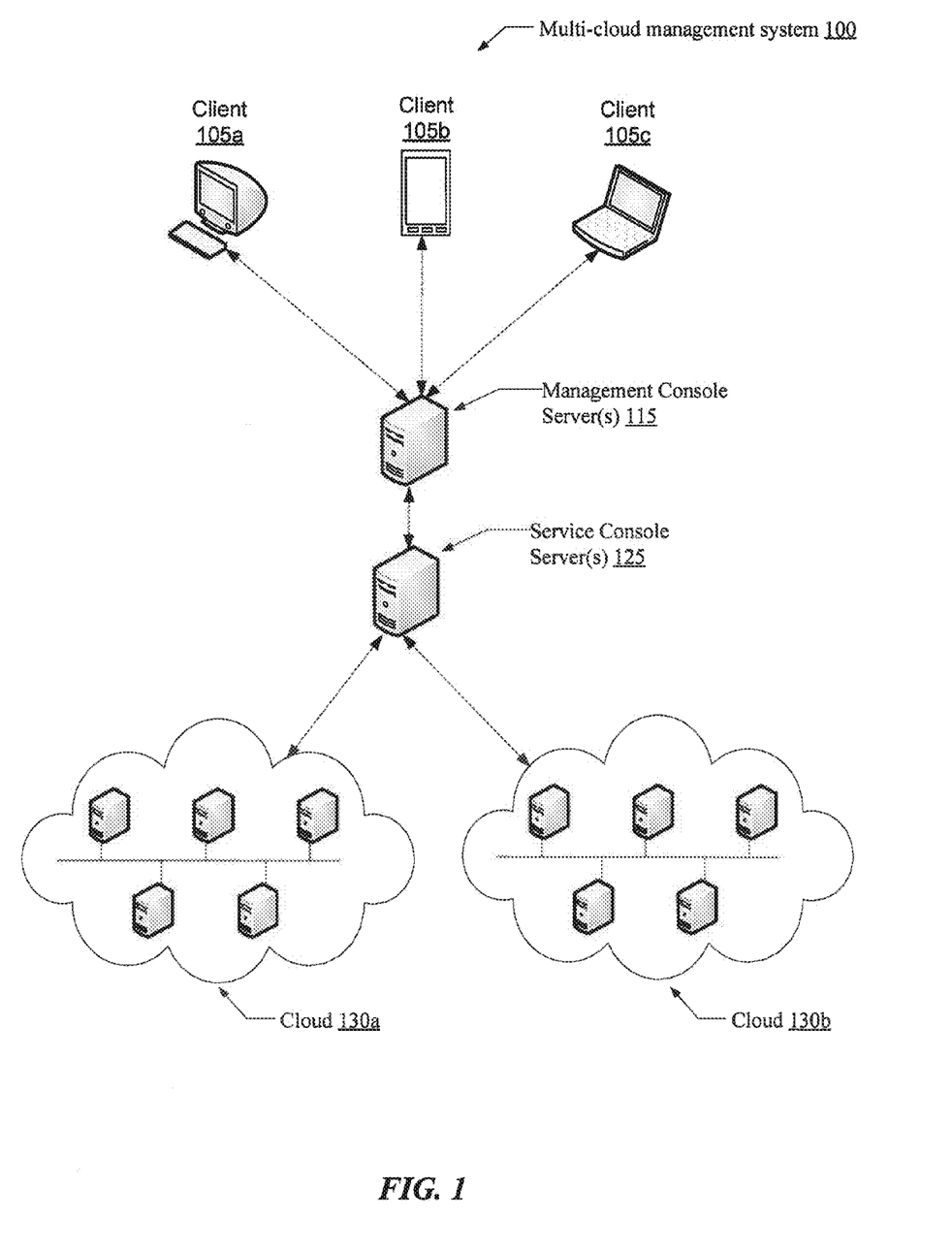
FIG. 1 is a schematic diagram illustrating the hardware environment of a multi-cloud management system embodying aspects of the invention.

FIG. 1 is a schematic diagram illustrating the hardware environment of a multi-cloud management system, according to some embodiments. Dashed lines indicate communications that may take place over any combination of one or more electronic communication networks, including local area networks (LAN) and/or wide area networks (WAN). The networks may use various communication protocols, including wireless networking protocols (e.g., WiFi), wired networking protocols (e.g., Ethernet), radio networking protocols (e.g., GSM, LTE), etc., and can be arranged in any configuration (e.g., point-to-point, broadcast, etc.). Such communications may utilize encryption, private networks, virtual private networks, and/or various other networking protocols and technologies.

According to FIG. 1, system 100 implements a client-server model where a plurality of clients 105a-105c connect to one or more management console servers 115 via a network. As illustrated, client hardware may correspond to any computing device, such as a desktop computer 105a, mobile device 105b, laptop 105c, and/or any other computing device.

Each of clients 105 may include respective software for accessing management console servers 115 via a network. In various embodiments, the respective software may include web browsers, browser plugins (e.g., "widgets"), and/or stand-alone applications. The software on clients 105 may be configured to access one or more interfaces (e.g., user or programmatic interfaces) exposed by management console servers 15 for managing the multi-cloud environment.

In the illustrated embodiment, multi-cloud management system 100 includes two levels of servers: (1) management console servers 115 (implementing one or more management consoles); and (2) service console servers 125 (implementing one or more services consoles). Servers 115 and/or 125 may comprise any number of physical and/or virtual machines (i.e., different physical machines, different virtual machines, and/or the same physical or virtual machines).

The management console provided by servers 115 may act as an intermediary between clients 105 and the service console provided by servers 125. For example, the management console server 115 may expose interfaces to clients 105 for setting multi-cloud management policies. Such interfaces may include user interfaces (e.g., web portals) and/or programmatic interfaces (e.g., web services, command line interfaces, console scripts, etc.). The service console provided by servers 125 may act as a backend intermediary between the management console provided by servers 115 and the provider platforms 130a and 130b.

In various embodiments, different organizations may control management console servers 115 and/or service console servers 125. For example, in some embodiments, an organization wishing to control its entire multi-cloud management middleware may deploy management console severs 115 and service console servers 125 on its own private network and/or on its own private cloud. In other embodiments, an organization may accept a multi-tenant usage model where the management console servers 115 and service console servers 125 are provided by a third-party cloud management provider. In such embodiments, the cloud management provider may control servers 115 and 125, using those servers to provide a single multi-tenant management console (e.g., password-controlled web portal) and separate service console instances for each organization. Thus, the multi-cloud management middleware may be provided by a third party as a service. In yet other embodiments, the multi-cloud management middleware may be provided in a hybrid fashion where a multi-tenant management console is provided by a third-party, but an organization deploys its own service console on servers in its private network. Thus, an organization may outsource the management console servers 115 but retain control over the service console servers 125.

Clouds 130a and 130b may correspond to cloud platforms provided by different providers (e.g., Amazon EC2™) and/or to one or more private clouds. As shown in FIG. 1, each cloud may comprise many interconnected physical machines, which may be located at one or more data centers. The computing resources of the physical machines may be elastically allocated to different parties wishing to utilize the resources (e.g., to deploy a web application). The elastic allocation may be achieved by deploying a plurality of virtual machines on the physical machines, where each virtual machine emulates a physical machine with specific computing resources, such as processing, memory, storage, network bandwidth or latency, and/or other computing resources. Thus, organizations wishing to deploy a web application may provision a set of virtual machines on the cloud and deploy the web application on those virtual machines. Because the virtual machines need not be shared with other organizations, the owner of the virtual machines can completely control the application environment and need not be concerned with interference from collocated applications belonging to other parties.

Figure 2:
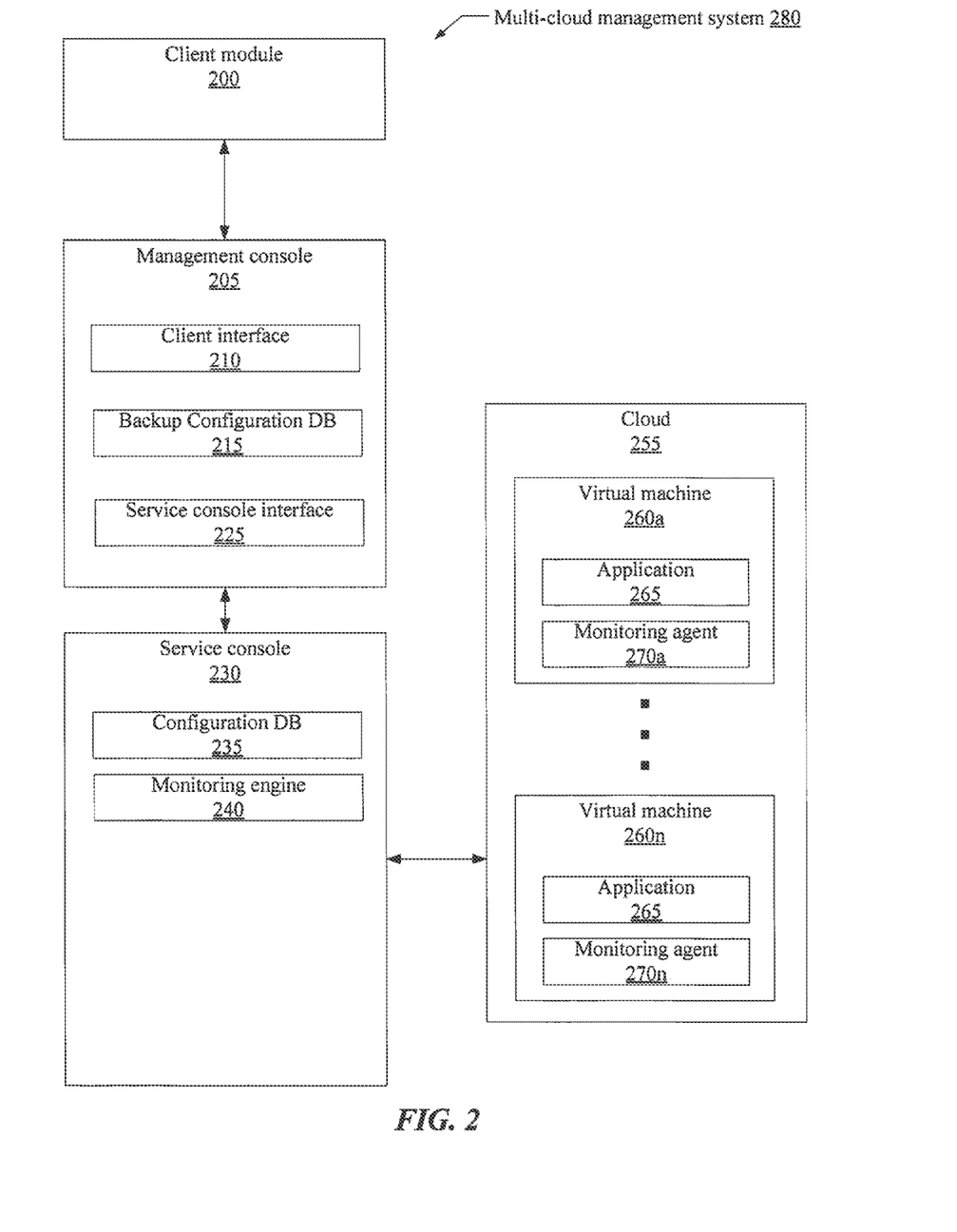
FIG. 2 is a block diagram illustrating the logical components of a multi-cloud management system embodying aspects of the invention.

FIG. 2 is a block diagram illustrating the logical components of a multi-cloud management system, according to some embodiments. In some embodiments, the components of FIG. 2 may be implemented as software executing on the corresponding hardware servers illustrated in FIG. 1. For example, client module 200 may execute on any of clients 105, management console 205 may execute on any of management console servers 115, service console 230 may execute on any of service console servers 125, and cloud 255 may execute on any of clouds 130.

Client module 200 may correspond to any software configured to allow users to interact with management console 205 (e.g., via client interface 210). For example, client module 200 may comprise a special-purpose stand-alone application configured to invoke network services and/or other network interfaces exposed by management console 205. In other embodiments, client module 200 may comprise a general-purpose application, such as a web browser, configured to display a web portal implemented by management console 205. Thus, client module 200 may be configured to display a graphical user interface, or "GUI" (e.g., web portal in a browser).

In the illustrated embodiment, multi-cloud management system 280 includes management console 205, which may allow client module 200 to interface with service console 230, via client interface 210. Management console 205 may be provided by one or more servers on an organization's network and/or by a third-party application service provider over a wide area network (e.g., the Internet) as discussed above.

Management console 205 may expose various client interfaces 210. Client interfaces 210 may comprise web portals, network services, and/or other interfaces that client module 200 may invoke for monitoring deployments.

Management console 205 may also have a backup configuration database 215. The backup configuration database 215 may contain all, or a subset, of the information contained in configuration database 235 of the service console 230, explained in further detail below. In some embodiments, the backup configuration database 215 may create a backup of configuration database 235 automatically at certain time intervals.

According to the illustrated embodiment, management console 205 may include a services console interface 225. The services console interface 225 may be used, for example, to push a request for a cloud auto-discovery and update to service console 230, or to initiate the on-boarding of a new client. As shown in FIG. 1, services console interface 225 may be configured to communicate with services console 230 over a wide area network, such as the Internet. For security, in some embodiments, service console interface 225 may be configured to maintain only a single network port to service console 230 and no connection to cloud 255.

Management console 205 provides client interface 210 (e.g., web portal in a browser) with which a user of client module 200 may monitor the applications and virtual machines deployed on the clouds. In some embodiments, client interface 210 may provide a web portal interface with which an administrator may, for example, view and monitor applications deployed on the multi-cloud infrastructure.

As shown in FIG. 2, service console 230 includes configuration database 235. Configuration database 235 may maintain data regarding an organization's cloud deployments. The database may include current deployment data, such as that identifying which applications are deployed, what computing resources are provisioned for those applications, from where (e.g., which clouds, data centers, clusters, etc.) the resources that are provisioned, and any other description of the current state of deployment. Additionally, configuration database 235 may include configuration information, such as application configuration information, virtual machine templates for provisioning new machines, a copy of management policies, account information for accounts at different cloud providers, and/or any other configuration information needed for managing a multi-cloud deployment.

In some embodiments, configuration database 235 may include one or more virtual machine templates that can be used to provision new virtual machines for a target application. A virtual machine template may include the software environment supporting the application, so that fully configured virtual machines may be provisioned quickly and/or automatically. In some embodiments, a virtual machine template for an application may be created when an application is registered in configuration database 235. Subsequently, when resources must be provisioned to support the application, the template may be used. The provisioning of new machines using the template may be included in the action part of a monitor and/or placement rule.

In some embodiments, an administrator may set up a template in configuration database 235 for easy manual provisioning. For example, a leader of a test team may create several templates and provide test team members with access to those templates. When a test team member logs into the web portal of the client interface 210 provided by management console 205, the user may be presented with the pre-defined templates and be able to quickly deploy virtual machines according to those templates (e.g., by pressing a button corresponding to the selected template). Thus, the templates stored in configuration database 235 may provide "single-click" access to deploying pre-defined virtual machine templates. In various embodiments, any user in a business unit/department may configure service policies and publish them to other users for use; the user interface for a user may show a list of available service profiles, which the user may deploy with a single click.

In other embodiments, service console 230 may automatically discover and migrate virtual machines. This process is further described below and in FIG. 3. Furthermore, service console 230 may automatically profile and provision virtual machines, or instances, using the predefined templates or profiles, as described in further detail below and in FIG. 4.

According to the illustrated embodiment, service console 230 includes monitoring engine 240 for monitoring cloud deployments. Monitoring engine 240 may be configured to monitor the runtime conditions of cloud deployments. The runtime conditions may be reported to administrators (e.g., via the web portal of client interface 210) and/or be used to trigger the monitoring policies.

Monitoring engine 240 may be configured to monitor runtime conditions by placing software agents deployed on virtual machines and using those agents to track runtime conditions on the virtual machines. For example, monitoring engine 240 has deployed monitoring agents 270a-270n on virtual machines 260a-260n of cloud 255 to monitor application 265. Using agents 270, monitoring engine 240 may track runtime conditions with relation to monitoring policies (e.g., workload characteristics, application health characteristics, resource utilization characteristics, derived metrics, etc.).

In various embodiments, monitoring engine 240 may collect runtime conditions using any of various push or pull techniques. For example, monitoring engine 240 may be configured to collect runtime conditions at each virtual machine by periodically receiving reports of local conditions (e.g., resource utilization metrics) from respective agents hosted on those machines. In another example, monitoring engine 240 may be configured to determine some runtime conditions (e.g., response time) through direct testing rather than through agent reports.

Figure 3:
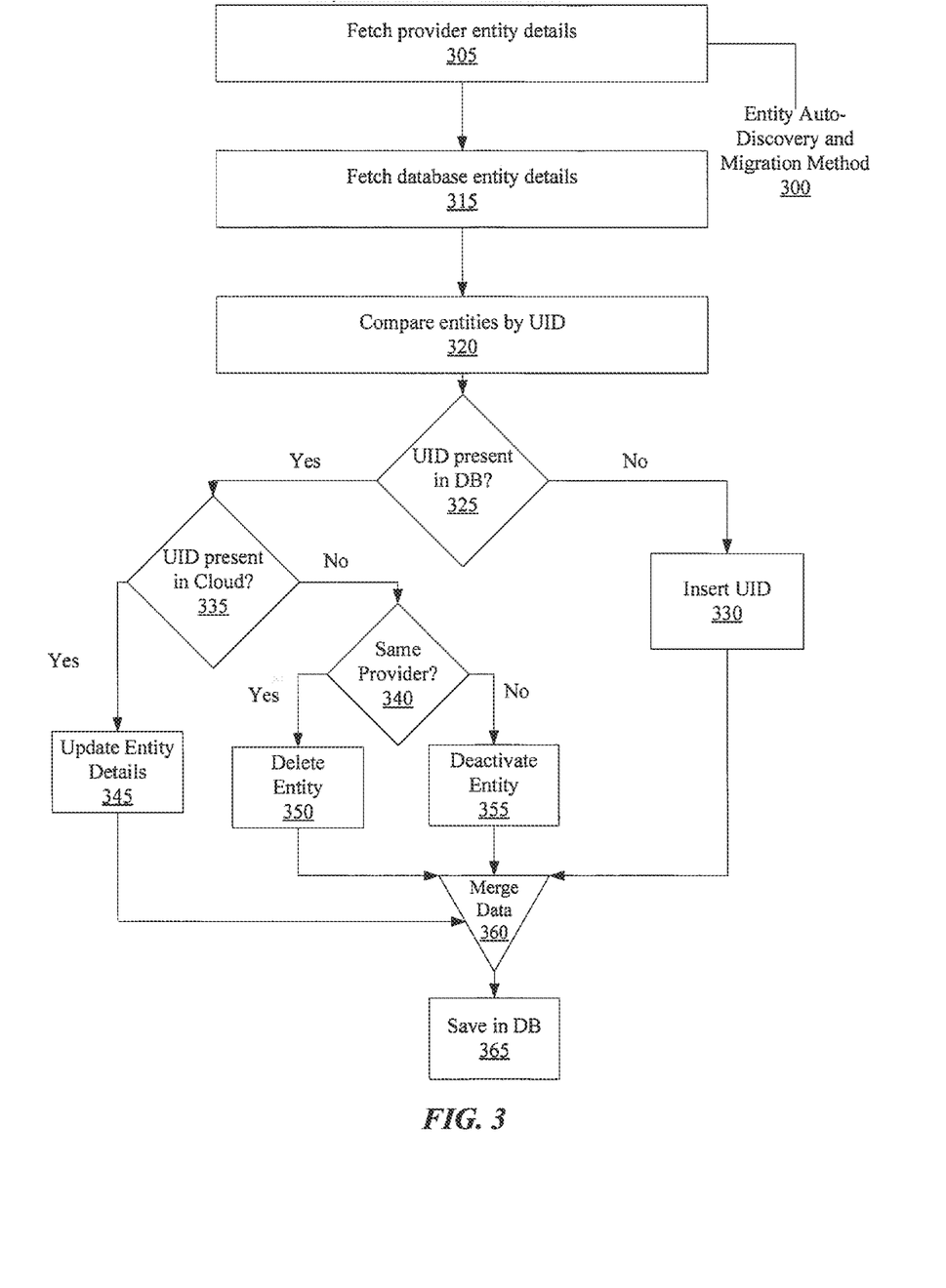
FIG. 3 is flow diagram illustrating an entity auto-discovery and migration method embodying aspects of the invention.

FIG. 3 is a flow diagram illustrating a virtual machine auto-discovery and migration method, according to some embodiments. In some embodiments, method 300 of FIG. 3 may be implemented by a multi-cloud management system using service console servers 125 and a service console 230. In other embodiments, a client or administrator may initiate method 300 from a client module 200 to service console 230 via management console 205 and service console interface 225.

The virtual machine auto-discovery and migration method 300 uses a unique ID ("UID") associated with each entity to identify uniqueness and perform entity comparison. In some embodiments, when adding new providers as a part of an on-boarding process for a multi-cloud management system, the need to compare individual entities does not arise, and UIDs are populated automatically for the entities associated with the newly added providers. In other embodiments, an entity may already be managed by the multi-cloud management application, and subsequent updates to the cloud infrastructure data are needed. In exemplary embodiments, the on-boarding and cloud infrastructure comparison and update are performed by a combination of the steps described below.

In exemplary embodiments, method 300 may apply to all entities, including data centers, clusters, hosts, data stores, and virtual machines that may, for example, be managed by a multi-cloud management system. Specific examples of providers may include: VMware vSphere, IBM Power VM, Amazon Web Services, etc. As explained below, there may be minor differences in method 300 based on the individual virtual cloud computing platforms.

In step 305, provider entity details are retrieved or fetched. Each provider may supply one or more entities, such as virtual machines, to a client. In an exemplary embodiment, the entity details are fetched across all of the providers for which a new user may have prior computing instances and/or for which current users have existing computing instances. The fetched details on the entities may include for example, one or more unique IDs ("UID"), in addition to other details describing the entity, such as any services run on or computing requirements of the entity.

In exemplary embodiments, the UID serves to uniquely identify entities in a multi-cloud management system. The UIDs may include, for example, an agent ID of a monitoring agent 270 running inside a virtual machine, a provider ID, which is the ID given to an entity by the provider, a public and/or private IP address of the entity, and/or a MAC address of the network interfaces of the virtual machine. Additionally, in some embodiments, an application blue-print or map running in the virtual machine may also uniquely identify an entity. The one or more UIDs may be generated by the multi-cloud management system, such as an agent ID of a monitoring agent 270. In other embodiments, the one or more UIDs may be generated by the provider, such as with a provider ID.

In some embodiments, the provider entity details are fetched by querying the provider. In some embodiments, administrative login credentials may be used to fetch entity details from a provider. For example, when on-boarding a new client, the client may simply need to provide the login credentials for each provider's platform for which the client has computing instances. The login credentials may be used to automatically access the platforms to obtain the fetched entity details in step 305. In some embodiments, a multi-cloud management platform uses the login credentials to automatically initiate the auto-discovery and migration method 300 and fetch the entity details in step 305.

In some embodiments, the provider entity details may be fetched using a variety of investigative techniques. For example, ports left open by the virtual machines may be scanned to detect a port pattern indicative of a particular operating system or server software. In another example, the virtual machines may be sent particular types of standard communications to which only a particular operating system is receptive. If an answer is received, it may be inferred that the virtual machine is executing the particular operating system. Various other such inference techniques are possible to discover the specifications of the deployed entities.

In step 315, database entity details are fetched. In some embodiments, the database entity details are fetched from a database in a multi-cloud management system, in exemplary embodiments, the database entity details are fetched from a configuration database 235 that contains cloud deployment and provisioning information. Additionally, in exemplary embodiments, each entity is identified by one or more UIDs as described above. In some embodiments, the entities may include virtual machines, hosts, data centers, resource pools, etc., which are each uniquely identified by one or more UIDs. In some embodiments, the fetched cloud provider entity details of step 305 and the fetched database entity details of step 315 includes the UID of each entity for which details are fetched.

There may be minor differences in the details fetched in steps 305 and 315 in FIG. 3 based on the provider. For example, if entity details are fetched from a VMware provider, the UID may be a provider ID, or more specifically, the managed object referenced ("MOR") ID assigned by the VMware provider. Additionally, the types of entities may vary across each provider. For example, in the case of IBM Power VM, the data center entity is not applicable, so no details will be fetched pertaining to data centers. As another example, in the case of Amazon Web Services, only instances may be applicable, and therefore only instance details are fetched. Additionally, for Amazon Web Services, the implementation might include regions and availability zones, which might be included with the fetched entity details.

In step 320, the cloud provider entity details fetched in step 305 are compared with the database entity details fetched in step 315. In step 320, the comparison includes, at least, an entity comparison by one or more UIDs. In exemplary embodiments, the comparison of UIDs may result in one or more updates to the configuration database 235 about current entity deployments and infrastructure. Such an update may require migrating deployment data from a provider to a configuration database about new entities. The comparison may include, for example, a combination or subset of steps 330, 335, 340, 345, 350, 355, 360, and 365, as described below. The logic encompassed in the following steps may apply generally to all entities, including data centers, clusters, hosts, data stores, virtual machines, etc.

In step 325, it is determined if the UIDs fetched from one or more providers in step 305 are already present in the database based on the UIDs fetched from the database in step 320. In some embodiments, the database is a configuration database managed by a multi-cloud management system. In an exemplary embodiment, the database may be configuration database 235 in a multi-cloud management middleware platform. In some embodiments, the service console server 125 of a multi-cloud management system 100 is configured to access the database and determine if a fetched UID is present in the database.

If a UID is not present in the database, then the fetched UID from the provider corresponds to an entity that is new to the multi-cloud management system. Such a situation may occur, for example, in the on-boarding process of a new client of the multi-cloud management middleware platform, where each computing instance from each provider may be new and therefore information on the new computing instance must be migrated into the multi-cloud management middleware platform. Another situation where a new UID may be discovered is when there is an action that occurs outside of the multi-cloud management middleware platform, such as a user independently adding a computing instance with a provider. As a result, in step 330, the UID will be migrated to a database, such as configuration database 235, and possibly merged with other data about the entity in step 360. In some embodiments, additional details associated with the entity corresponding to the UID will be migrated and merged to configuration database 235 in step 360.

In some instances, the UID will already be present in the multi-cloud management platform database. This may occur, for example, when the multi-cloud management application had previously identified and stored information about the entity corresponding to the UID, such as from a previous on-boarding process or infrastructure update. In such instances, it may be desirable to evaluate if the entity corresponding to the UID is still in use by a client and available from a provider, so that the multi-cloud management system may maintain an up to date inventory of all of the active entities to manage.

If the UID exists in the database, then in step 335 it is determined if the UID is present in the cloud. In exemplary embodiments, this determination is based on comparing the fetched UID in step 305 with the UID fetched from the database in step 315. In some embodiments, if the UID of an entity fetched from a provider in step 305 matches the UID of an entity fetched from a database in step 315, then the entity still exists on the provider platform and is still in use by a client of the multi-cloud management application. Consequently, in step 345, the details of an entity associated with a UID in the database, such as configuration database 235 of a multi-cloud management system, are updated with the entity details associated with the same UID) fetched in step 305. These details may include, for example, the data typically stored in configuration database 235 about each entity. In some embodiments, the fetched details in step 305 about each entity 260 in cloud 255 may include, for example, computing requirements and services running on the entity.

Alternatively, if the UID, or entity, does not exist in the cloud, then it is determined whether the provider has changed in step 340. In some embodiments, each entity is associated with a cloud and/or provider. Furthermore, in some embodiments, an entity, such as a virtual machine, may become provisioned by a different provider by, for example, a multi-cloud management system. Therefore, it may be desirable to determine if the entity is obsolete or is provisioned by a different provider for purposes of managing entities in a multi-cloud management system.

In some embodiments, if a UID exists in the database but not in the cloud, then the entity may generally be considered obsolete. For example, if entity information, including a UID is stored in the database but is no longer in the cloud, and the provider of the entity has not changed, then the entity should be deleted from the database as obsolete. Accordingly, in step 350, the UID and information associated with the entity corresponding to the UID is deleted from the configuration database. Additionally, in some embodiments, if the provider associated with the entity has changed, as identified by the software component or monitoring agent 270 running inside the virtual machine, then the entity associated with the old cloud provider in the database may simply be indicated as de-activated in step 355.

In step 360, the data generated from steps 345, 350, 355, and 330 is merged in step 360 and saved in the database in step 365. In step 365, the merged data may be saved, for example, in a configuration database 235 maintained and/or hosted by the multi-cloud management application. The merge function is described in greater detail below.

In some embodiments, method 300 may be employed by a pull technology. Such pull technology may allow, for example, a user of a cloud-management application to issue a manual sync-up request. In other embodiments, method 300 may be employed as a push technology. Furthermore, method 300 may be implemented using a combination of push and pull technology.

Figure 4:
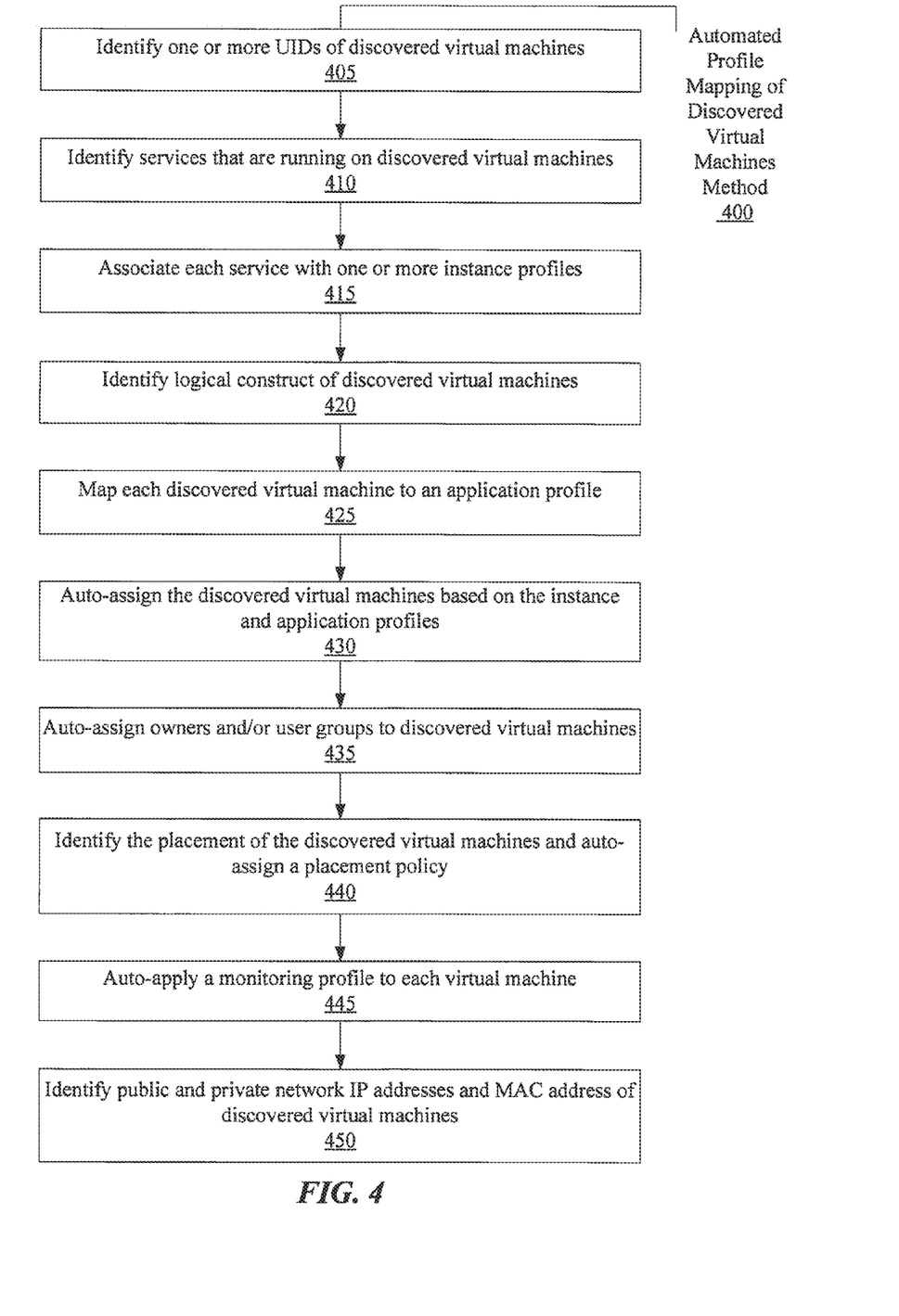
FIG. 4 is a flow diagram illustrating an automated profile mapping of discovered entities method embodying aspects of the invention.

FIG. 4 is a flow diagram illustrating an automated profile mapping of discovered virtual machines method, according to some embodiments. It may be desirable to utilize templates or profiles in order to provision entities, including virtual machines, for a target application. In exemplary embodiments, the method of FIG. 4 may be performed as a component of the entity auto-discovery method, such as in the merge data step 360 of FIG. 3.

According to some embodiments, profile mapping may be performed manually, as described above. For example, an administrator may set up a template or profile in configuration database 235 for manual provisioning. When a member logs into the web portal provided by management console 205, the user may be presented with the predefined profiles and be able to deploy virtual machines and/or other entities according to those profiles. However, it may be desirable to automate the profiling process, particularly when on-boarding a new user with many instances spread across multiple providers, according to the automated service profile mapping method 400, illustrated in FIG. 4.

In step 405, one or more UIDs of discovered virtual machines are identified. In exemplary embodiments, at least the provider IDs and the agent IDs, if applicable, of the discovered virtual machines are identified in step 405. For example, in the case of a discovered VMware virtual machine, the identified provider ID may be a MOR ID. Additionally, in situations where the discovered virtual machine is a previously running virtual machine that was or is currently managed by a multi-cloud management system, the agent ID of the management system's monitoring agent 270 is identified In some embodiments, the monitoring agent 270 associated with the agent ID may indicate that the virtual machine has undergone some changes.

In step 410, services that are running on discovered virtual machines and/or entities are identified. In some embodiments, the services may be identified in configuration database 235. For example, configuration database 235 may contain information about each entity, or virtual machine, that is associated with a UID, and the service associated with each entity. In other embodiments, the virtual machines and services are identified in auto-discovery and migration method 300. For example, in addition to comparing the UID of various entities, various data may be collected in the auto-discovery and migration method 300 pertaining to each entity, including configuration and/or deployment information, in order to identify services running on each discovered entity. In some embodiments, a monitoring agent 270 associated with an identified agent ID in step 405 on a discovered virtual machine may identify the services currently and/or previously running on that virtual machine.

In step 415, each service is associated with one or more instance profiles. In some embodiments, instance profiles may relate to, for example, various database or middleware instances, etc. In an exemplary embodiment, the instance profile describes a variety of details about the virtual machine, such as operating system, stored components, required computing resources, IP addresses, ownership, etc. In some embodiments, these details are obtained as a part of the auto discovery and migration method 300. In other embodiments, one or more instances may be associated with the same instance profile. In some embodiments, the instance profile associated with each service and/or virtual machine is stored in configuration database 235.

In step 420, the logical construct of the discovered virtual machines is identified. The logical construct may be based, for example, on network topology and security settings of the virtual machine. In some embodiments, the logical construct details are obtained as a part of the auto discovery and migration method 300. In other embodiments, the logical construct details are stored in configuration database 235. In some embodiments, the logical construct may be obtained from a monitoring agent 270 situated on a discovered virtual machine.

In step 425, the discovered virtual machines are mapped to an application profile. In exemplary embodiments, each application profile consists of one or more instance profiles. In some embodiments, the identified logical constructs of the discovered virtual machines in step 420 may be used to automatically assign application profiles to the discovered virtual machines. For example, if there are three new discovered virtual machines, and they fit into three instance profiles (A, B, and C) of an application, then the three instances may be characterized as belonging to an application profile ABC. As another example, there may be three virtual machine components, associated with instance profiles, created by the same user at the same location. Therefore, a multi-cloud management system may assume that the three components are grouped together, and map the instance profiles of the components to an application profile. In some embodiments, the application mappings may be stored in configuration database 235.

In step 430, the virtual machines are auto-assigned based on the identified instance profiles and the mapped application profiles. Once the services are associated with and mapped to instance profiles and application profiles, respectively, the auto-assignment of virtual machines in step 420 may be made according to various multi-cloud management platform policies. The assignment may relate to, for example, resource allocation objectives of a multi-cloud management platform. For example, there may be two newly discovered virtual machines that both fit into the instance profile A. If the multi-cloud management platform has observed, based on monitoring events and other alerts, that application profile ABC was previously in a stressed condition, then the platform might auto-assign the two virtual machines to application profile ABC.

In step 435, owners and/or user groups are auto-assigned to discovered virtual machines. In some embodiments, a multi-cloud management system may contain policies concerning owners and user-groups. In such embodiments, the discovered virtual machines may be assigned accordingly to the owners and/or user-groups to which they belong so that they may be managed by a multi-cloud management system according to group and owner policies. In some embodiments, owners and user/groups are assigned to discovered virtual machines based on the service and application profiles.

In step 440, the placement of the discovered virtual machines is identified and the virtual machines are auto-assigned a placement policy. In some embodiments, a multi-cloud management system may contain placement policies. Accordingly, the discovered virtual machines may be auto-assigned a placement policy based on their identified placement and/or application and service profiles.

In step 445, a monitoring profile is automatically applied to each virtual machine. In some embodiments, a multi-cloud management system may deploy monitoring agents 270 to each virtual machine to monitor changes and/or activities associated with each machine. In exemplary embodiments, the monitoring profiles are applied to instances and/or applications associated with each virtual machine based on the services that are running on each virtual machine. In some embodiments, the application profiles may be stored in configuration database 235.

In step 450, public and private network IP address and MAC addresses of the discovered virtual machines are identified. In some embodiments, the discovered addresses may be stored in configuration database 235. In other embodiments, the addresses may be used in the auto-discovery and migration method 300 in order to identify uniqueness of each virtual machine.

Figure 5:
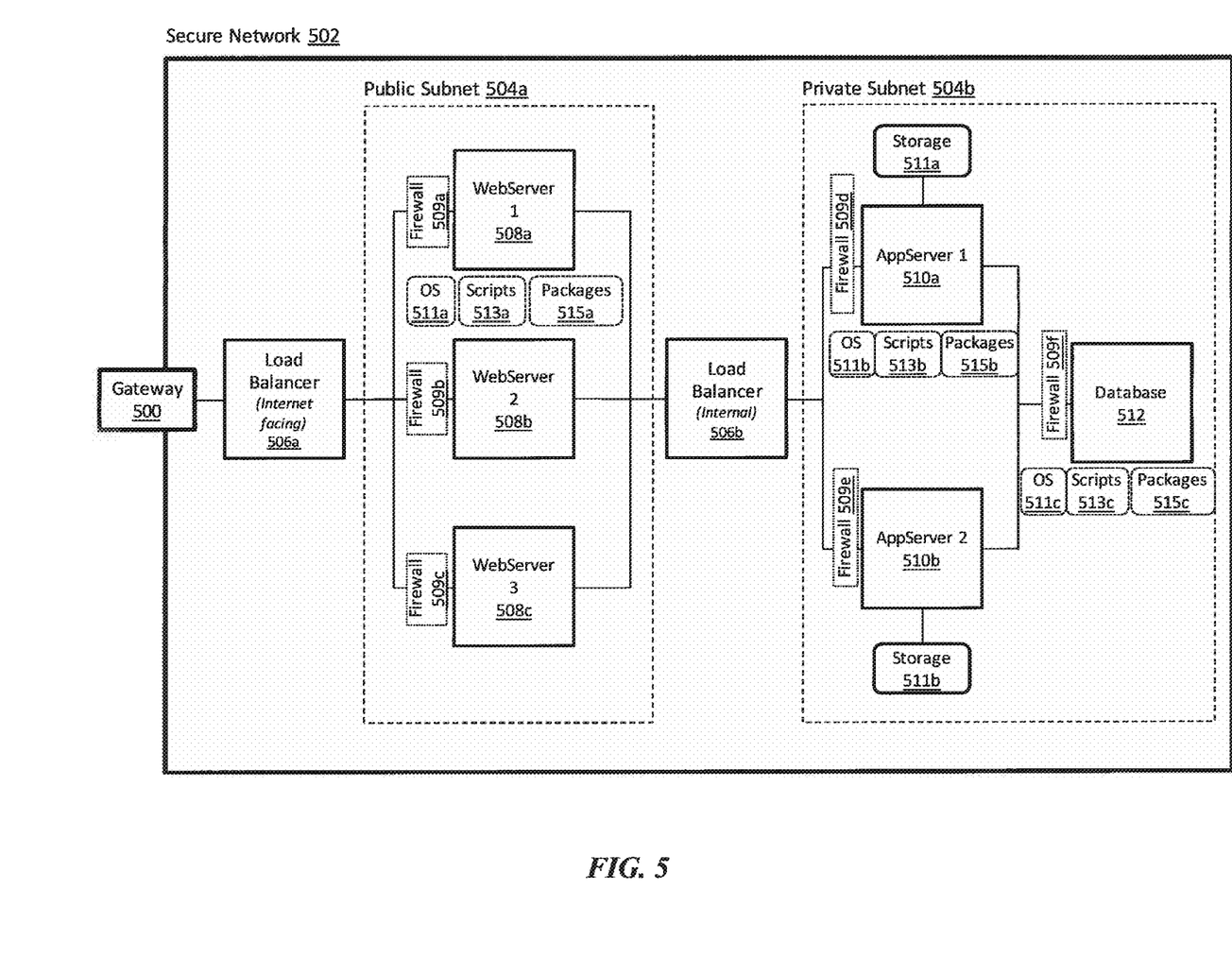
FIG. 5 is a block diagram illustrating an architectural view component of a multi-cloud management system embodying aspects of the invention.

FIG. 5 is a block diagram illustrating an architectural view component of a multi-cloud management system, according to some embodiments. As part of the auto-discovery process and migration of virtual cloud infrastructure, a pictorial representation, called an architectural view, of the infrastructure and network topology from one or more cloud providers may be built and displayed. This detailed visual overview would be available upon completion of the auto-discovery method described above and allows a user to immediately get a topology view of the infrastructure resources like the virtual machines, storage and network details, etc. The architectural view thereby enables users to get a better view to more effectively manage the virtual resources and applications.

In exemplary embodiments, multi-cloud management system 100 is configured to provide a detailed architectural view of the discovered infrastructure and network topology. In some embodiments, the pictorial architectural view may be generated based on the collected data from the auto-discovery and migration method described above. Additionally, the architectural view may be generated based on the profile mappings and configuration of discovered virtual machines, and depict those configurations. In exemplary embodiments, the architecture view is generated based on managed entity data that was imported into configuration database 235, as described above. Such data may include, for example, the dependencies, configurations, connections, etc. between managed virtual machines, storage devices, and network components.

In some embodiments, the management console 205 is configured to generate an architectural view to be displayed on a GUI on client module 200 on client 105 via client interface 210. FIG. 5 depicts an example of an architectural view of a secure, 3-tier application stack that may be displayed on such a GUI. Networks may be depicted in the architectural view, for example, as solid or dashed lines. In FIG. 5, secure network 502 is indicated by a solid line, and public subnet 504a and private subnet 504b are each indicated by a dashed-line. Computing instances and network elements may be indicated by a variety of icons. For example, FIG. 5 depicts a gateway 500, web servers 508a-c, load balancers 506a and 506b, application servers 510a and 510b, storage 511a and 511b, and database server 512 as block icons. However, in some embodiments, such icons may vary across network elements, for example, by color, shape, design, image, etc.

FIG. 5 depicts a non-limiting example of an architectural view of three web servers 508a-c hosted inside a public subnet 504a, and two application servers 510a and 510b and database server 512 hosted inside a private subnet 504b. The components depicted in the architectural view may be dynamic and vary depending on the discovered entity data that may be stored in configuration database 235. For example, if a fourth web server were to be provisioned for the application, that server would show up in the architectural view for that application. It is contemplated that different icons and objects relating to other discoverable entities and network configurations/infrastructure may be displayed in the architectural view that are not presently displayed in FIG. 5.

The non-limiting architectural view in FIG. 5 may instantly indicate to the user that, for this specific setup, the three web servers 508a-c can send and receive internet traffic directly, whereas the application servers 510a and 510b and database server 512 cannot send or receive any internet traffic because they are located in private subnet 504b. Additionally, the architectural view may show that each server is protected by firewalls 509a-f, and has its own scripts 513a-c, packages 515a-c, and operating systems 511a-c. The architectural view may display load balancers. For example, FIG. 5 depicts one internet facing load balancer 506a that resides in between the gateway 500 and the webservers 508a-c, and distributes the load between the webservers 508a-c. Additionally, FIG. 5 depicts a second internal load balancer 506b that resides between the web servers 508a-c and application servers 510a and 510b, and distributes the load between the application servers 510a and 510b. FIG. 5 also depicts that each application server 510a and 510b has storage 511a and 511b, respectively, attached to it. Therefore, a user can determine from looking at the architectural view of FIG. 5 that users may access the application stack using the gateway 500 within a secure network connection 502.

Figure 6:
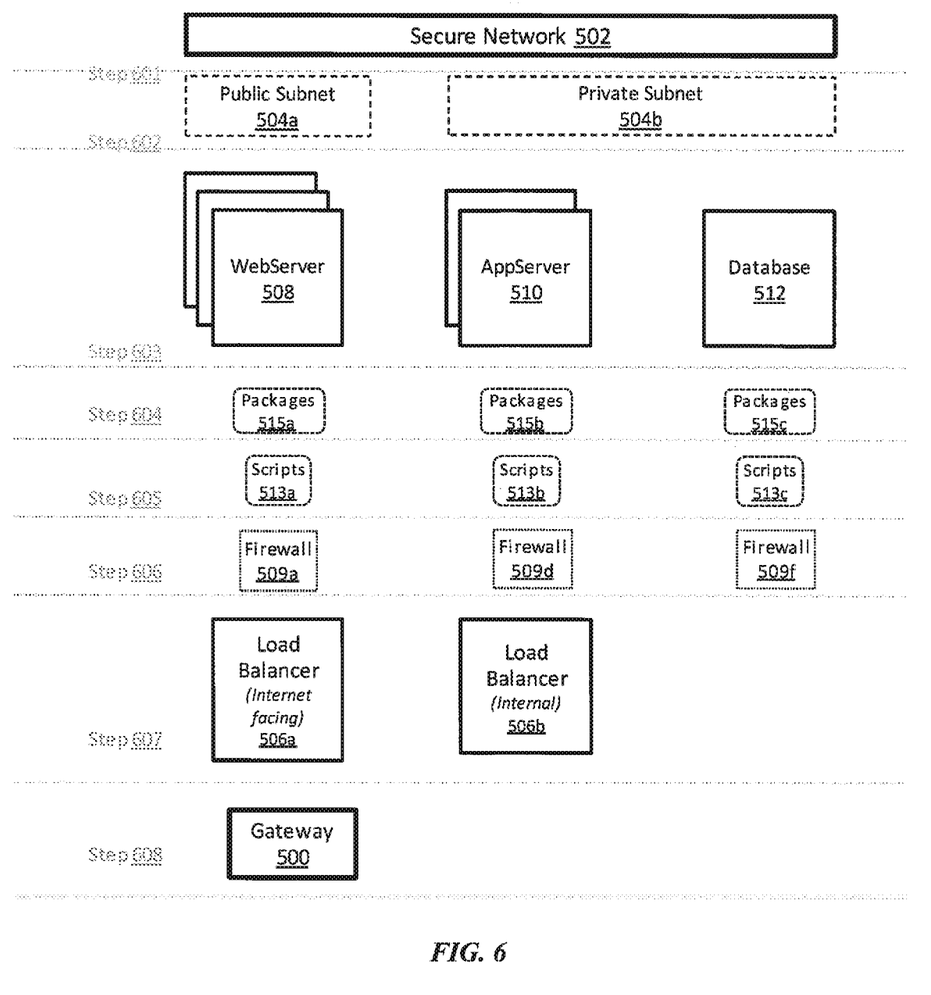
FIG. 6 is a flow diagram illustrating an application definition method of a multi-cloud management system embodying aspects of the invention.

FIG. 6 is a flow diagram illustrating an application definition method of a multi-cloud management system embodying aspects of the invention. In exemplary embodiments, a multi-cloud management system 100 is configured to allow a user to select available network resources and infrastructure to deploy or define an application. In some instances, it may be desirable or necessary to configure the architecture for an application as a series of ordered steps. Although instance profiles and mapping may be performed automatically using the automated profile mapping of discovered virtual machines method described above, it may be desirable to allow users to manually define the computing resources and network elements for an application or other computing instance. Such manual set up may be facilitated by the architecture view described above.

In some embodiments, management console 205 may generate a GUI to be displayed on client module 200 on client device 105 via client interface 210. The GUI may allow a user to select various network components and computing instances, for example, from the architecture view, and define a series of steps for configuring and networking the selected components to support an application. For example, such selection may occur via a combination of selection tools depicted in a GUI, such as drop-down bars, menus items, popups, icons etc. Additionally, the available, or selectable, network components and computing instances may be based on data stored in configuration database 235 from the auto-discovery and migration method described above. Such available and/or selectable network components may be displayed via the architecture view described above.

FIG. 6 depicts a non-limiting example of an application definition method designed to secure a three-tiered application. It is contemplated that other types of managed applications and computing instances may be defined using any available or selectable network components and computing instances that may depicted in the architectural view or stored in configuration database 235. In the non-limiting example in FIG. 6, to secure the three-tiered application, a secure network 502 is selected in step 601, which can be accessed only through a defined gateway. Within this secure network 502, step 602 is to configure two subnets 504—a public subnet 504a and a private subnet 504b. In a public subnet 504a, the instances can receive inbound traffic from the internet and send outbound traffic directly to the internet whereas instances in the private subnet 504b cannot. Once the subnets 504 are defined in step 602, the compute instances are created in step 603. FIG. 6 depicts the selection of a three tier application consisting of three web servers 508, two application servers 510, and a database server 512. The non-limiting architecture view of such a secure three tier application is depicted in FIGS. 5 and 7.

Once the compute instances are selected and created in step 603, the middleware and application packages are deployed on the instances in steps 604 and 605. For example, of the web servers 508, application servers 510, and database 512 are each separately configured with their own packages 515*a-c* and scripts 513*a-c*. In step 606, firewalls 509*a*, 509*d*, and 509*f* are configured on the instances to control what traffic is allowed. In step 607, the instances are connected to the selected load balancers 506*a* and 506*b*, which distribute the load between the instances. In step 608, a load balancer 506*a* may be connected to a gateway 500.

A person of skill in the art can appreciate that steps 601-608 described above may be implemented in a variety of orders, and certain steps may be eliminated or added, depending on the needs of the application being defined. It is contemplated that the architecture view and definition of an application will vary depending on, for example, the type of application, the availability and types of managed entities, and provisioning policies that are implemented by the multi-cloud management platform 100.

Figure 7:
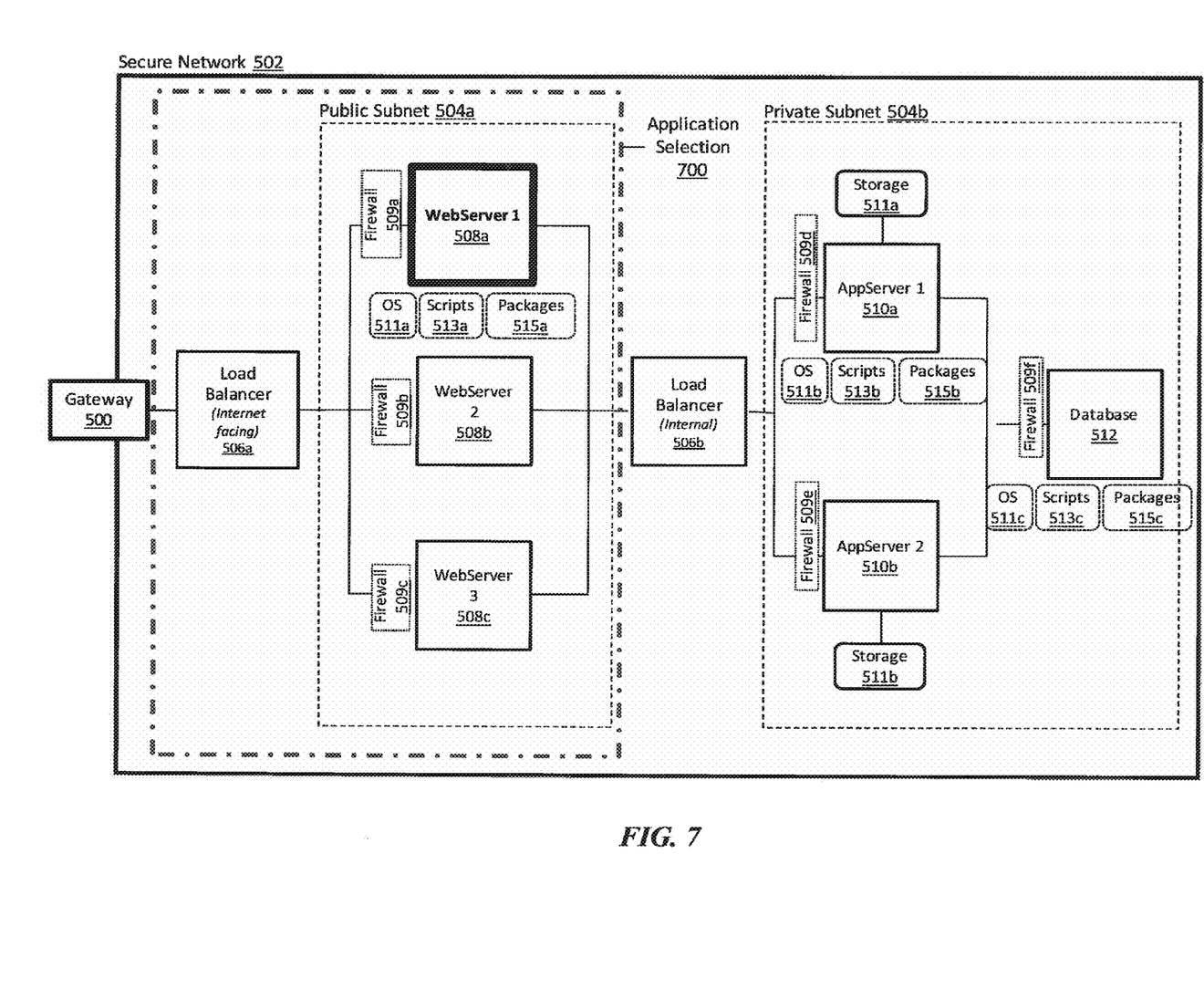
FIG. 7 is a block diagram illustrating interactive selection and migration in an architectural view component of a multi-cloud management system embodying aspects of the invention.

FIG. 7 is a block diagram illustrating interactive selection and migration in an architectural view component of a multi-cloud management system, according to some embodiments. The architectural view depicted in FIGS. 5 and 7 may contain interactive components that allow users to, for example, view additional details of a resource or entity in the topology, change the configuration topology, or migrate the topology to a different cloud provider. As explained above, the architectural view of the topology may be depicted in a GUI displayed on a client 105.

In some embodiments, the high level discovered topology depicted in the architectural view in a GUI can be further drilled down or expanded to get additional details on the resources or entities in the topology. For example, a virtual machine in the topology can be represented by a simple icon. The icon may be user-interactive, such that by clicking an icon, further details may be displayed like the CPU, memory, storage, network, firewall, etc. In some embodiments, the topology along with individual components can be user-interactive so that user can drag-and-drop to, for example, re-design a network layout, select how virtual machines are connected to hosts, or how hosts may form a cluster. In additional embodiments, a user may select components from the architecture view to build and define an application through a series of ordered or unordered steps, as described for FIG. 6. These GUI changes can then be saved so that it reflects in the cloud infrastructure.

In exemplary embodiments, a generated topology in an architecture view can be used to migrate cloud resources details from one provider specific environment to another. For example, a topology generated with a vmware provider can be used to migrate the set of information or structure contained in the topology to another provider like Microsoft Hyper-V. In some embodiments, there may be configuration adjustments done during the migration process based on a manual or automated process. For example, source and destination configuration and conversion rules can be defined through profiles, as explained above. During the migration process, these pre-defined profiles and/or templates would be used to generate the target provider configuration set of the resources.

FIG. 7 depicts the visual selection of an application, or a portion of the application, or an architectural component of the application for actions. The selection in FIG. 7 is depicted by the dashed application selection line 700. Once a user has selected a portion, such as web server 508*a*, a user may initiate one or more possible actions, including, for example, migration of the selected portion 700 from the current cloud platform (or provider) to another platform (or provider), power on, power off, modify storage, modify computing instance, clone instance, convert to image, or delete. Or, for example, the user may select an icon to be included in a new application, as described above for FIG. 6.

Figure 8:
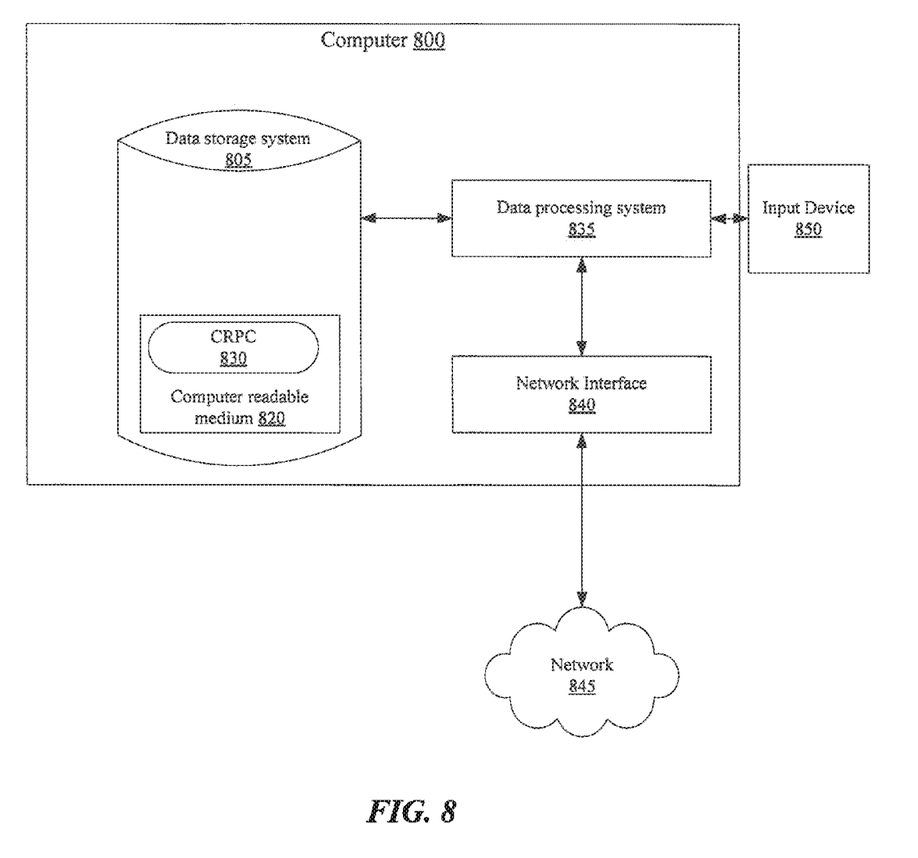
FIG. 8 illustrates a possible implementation for at least some components of a physical computer embodying aspects of the invention.

FIG. 8 illustrates a possible implementation for at least some components of a physical computer, according to some embodiments. In some embodiments, computer 800 may correspond to any physical computer, such as any of clients 105, servers 115, 125, and or nodes in clouds 130*a* or 130*b* of the multi-cloud management system 100 of FIG. 1. In some embodiments, the physical components illustrated in FIG. 1 may be simulated by virtual components of a virtual machine, such as any of virtual machines 260 of FIG. 2.

As shown in FIG. 8, computer 800 may include a data processing system 835. In some embodiments, data processing system 835 may include any number of computer processors, any number of which may include one or more processing cores. In some embodiments, any of the processing cores may be physical or logical. For example, a single core may be used to implement multiple logical cores using symmetric multi-threading.

Computer 800 also includes network interface 840 for receiving messages (e.g., messages transmitted from clients 105) and transmitting messages over network 845, and a data storage system 805, which may include one or more computer-readable mediums. The computer-readable mediums may include any number of persistent storage devices (e.g., magnetic disk drives, solid state storage, etc.) and/or transient memory devices (e.g., Random Access Memory).

The data processing system 835 of computer 800 may also be connected to an input device 850, such as a mouse, keyboard, touchscreen, voice capture device for voice recognition, etc. In some embodiments, input device 850 may be connected to computer 800 via a network 845 and a network interface 80, and in other embodiments the input device 850 may be directly connected to the processing system 835 of computer 800, such as via a wire, cable, or wireless connection. In some embodiments, the data processing system 835 of computer 800 may be couple to a display device, for example, to display the client interface 210, as a GUI for example, on client module 200. Input device 850 may be used to manipulate images, text, data, etc. that may be displayed on the display device.

In embodiments where data processing system 835 includes a microprocessor, a multi-cloud management system or any subcomponents may be provided as a computer program product. Such a computer program product may include computer readable program code ("CRPC") 830, which implements a computer program, stored on a computer readable medium 820. Computer readable medium 820 may include magnetic media (e.g., a hard disk), optical media (e.g., a DVD), memory devices (e.g., random access memory), etc. In some embodiments, computer readable program code 830 is configured such that, when executed by data processing system 835, code 830 causes the processing system to perform steps described above.

In other embodiments, computer 800 may be configured to perform steps described above without the need for code 830. For example, data processing system 835 may consist merely of specialized hardware, such as one or more application-specific integrated circuits (ASICs). For example, in some embodiments, the functional components described above may be implemented by data processing system 835 executing computer instructions 830, by data processing system 835 operating independent of any computer instructions 830, or by any suitable combination of hardware and/or software.

While various embodiments of the present invention have been described above, it should be understood that they have been presented by way of example only, and not limitation. Thus, the breadth and scope of the present invention should not be limited by any of the above-described exemplary embodiments.

The invention claimed is:

1. A system for managing auto-discovery and migration of virtual cloud infrastructure on a cloud management platform comprising:
a configuration database, wherein the configuration database is configured to store managed entity attributes;
a first server comprising a service console, the first server electronically coupled to a computer network and configured to:
retrieve, via the computer network, entity attributes associated with one or more managed entities from one or more cloud providers, wherein the managed entity attributes and the retrieved entity attributes comprise one or more services running on the one or more managed entities;
compare the retrieved entity attributes to the managed entity attributes to determine if the managed entity attributes correspond to the retrieved entity attributes;
update, based on the comparison, the managed entity attributes;
store the updated managed entity attributes in the configuration database;
identify one or more services running on the one or more managed entities based on the updated managed entity attributes;
associate each of the identified services with one or more instance profiles;
map each of the instance profiles associated with each of the identified services to one or more application profiles,
store the one or more instance profiles and the one or more application profiles for each of the one or more identified services running on the one or more managed entities in the configuration database;
a second sever comprising a management console, the second server configured to:
generate an architectural view of the updated managed entity attributes based on the stored instance profiles and application profiles; and
display, on a display device electronically coupled to the second server, the architectural view in a graphical user interface.

2. The system of claim 1, wherein, as part of updating the managed entity attributes and storing the updated managed entity attributes, the first server is further configured to perform at least one of:
store the retrieved entity attributes in the configuration database,
replace one or more of the managed entity attributes stored in the configuration database with one or more of the retrieved entity attributes, and
delete the managed entity attributes stored in the configuration database based on the retrieved entity attributes.

3. The system of claim 1, wherein the one or more application profiles include configuration and conversion rules to migrate an application to a target cloud provider.

4. The system of claim 1, wherein the architectural view comprises a user-interactive topology that is displayed in the graphical user interface and depicts the managed entities and associated infrastructure and network elements.

5. The system of claim 4, wherein the first server is further configured to:
migrate the full or partial topology to other resources or cloud providers based on user actions to the topology.

6. The system of claim 4, wherein the second server is further configured to:
define a new application based on user actions to the topology.

7. The system of claim 1, wherein the first server is further configured to:
use investigative techniques to retrieve entity attributes from the one or more cloud providers, wherein the investigative techniques comprise one or more of: using login credentials for one or more cloud providers, scanning ports left open by virtual machines, and transmitting communications to virtual machines to which only a particular operating system is receptive.

8. A method for managing auto-discovery and migration of virtual cloud infrastructure on a cloud management platform, the cloud management platform comprising a configuration database, a first server comprising a service console and a second server comprising a management console, the method comprising:
storing managed entity attributes in the configuration database;
retrieving over a computer network, by the first server, entity attributes associated with one or more managed entities from one or more cloud providers, wherein the managed entity attributes and the retrieved entity attributes comprise one or more services running on the one or more managed entities;
comparing, by the first server, the managed entity attributes to the retrieved entity attributes to determine if the managed entity attributes correspond to the retrieved entity attributes;
updating, by the first server, the managed entity attributes based on the comparison;
storing, by the first server, the updated managed entity attributes in the configuration database;
identifying, by the first server, one or more services running on the one or more managed entities based on the updated managed entity attributes;
associating, by the first server, each of the identified services with one or more instance profiles;
mapping, by the first server, each of the instance profiles associated with each of the identified services to one or more application profiles; and,
storing, by the first server, the one or more instance profiles and the one or more application profiles for each of the one or more identified services running on the one or more managed entities in the configuration database; and,
generating, by the second server, an architectural view of the updated managed entity attributes based on the stored instance profiles and application profiles; and
displaying, by the second server computer, the architectural view in a graphical user interface on a display device electronically coupled to the second server.

9. The method of claim 8, wherein the steps of updating the managed entity attributes and storing the updated managed entity attributes further comprise at least one of:
storing the retrieved entity attributes in the configuration database, replacing one or more of the managed entity attributes stored in the configuration database with one or more of the retrieved entity attributes, and deleting the managed entity attributes stored in the configuration database based on the retrieved entity attributes.

10. The method of claim 8, wherein the one or more application profiles include configuration and conversion rules to migrate an application to a target cloud provider.

11. The method of claim 8, wherein the architectural view comprises a user-interactive topology that is displayed in the graphical user interface and depicts the managed entities and associated infrastructure and network elements.

12. The method of claim 11, further comprising:

migrating the full or partial topology to other resources or providers based on user actions to the topology.

13. The method of claim 11, further comprising:

defining a new application based on user actions to the topology.

14. The method of claim 1, further comprising:

using investigative techniques to retrieve entity attributes from one or more providers, wherein the investigative techniques comprise one or more of: using login credentials for one or more providers, scanning ports left open by virtual machines, and transmitting communications to virtual machines to which only a particular operating system is receptive.

15. A computer-readable storage medium storing program instructions executable by a computer to implement:

a configuration database, wherein the configuration database stores managed entity attributes;

a services console executed on a first server electronically coupled to a computer network, the first server configured to:

retrieve, over the network, entity attributes from one or more providers associated with one or more managed entities, wherein the managed entity attributes and the retrieved entity attributes comprise one or more services running on the one or more managed entities;

compare the managed entity attributes and the retrieved entity attributes to determine if the managed entity attributes correspond to the retrieved entity attributes;

update, based on the comparison, the managed entity attributes;

store the updated managed entity attributes in the configuration database;

identify one or more services running on the one or more managed entities based on the updated managed entity attributes;

associate each of the identified services with one or more instance profiles;

map each of the instance profiles associated with each of the identified services to one or more application profiles;

store the one or more instance profiles and the one or more application profiles for each of the one or more identified services running on the one or more managed entities in the configuration database; and, a management console executed on a second server, the second server configured to:

generate an architectural view of the updated managed entity attributes based on the stored instance profiles and application profiles; and, display, on a display device electronically coupled to the second server, the architectural view in a graphical user interface.

16. The system of claim 1, wherein the first server is further configured to:

automatically assign one or more owners to the one or more managed entities;

identify the placement of the one or more managed entities;

automatically assign a placement policy to the one or more managed entities based on the identified placement; and automatically apply a monitoring profile to each of the one or more managed entities.

17. The method of claim 8 further comprising:

automatically assigning, by the first server, one or more owners to the one or more managed entities;

identifying, by the first server, the placement of the one or more managed entities;

automatically assigning, by the first server, a placement policy to the one or more managed entities based on the identified placement; and automatically applying, by the first server, a monitoring profile to each of the one or more managed entities.

18. The computer readable storage medium of claim 15 storing program instructions executable by a computer to implement the services console executing on the first server, the first server further configured to:

automatically assign one or more owners to the one or more managed entities;

identify the placement of the one or more managed entities;

automatically assign a placement policy to the one or more managed entities based on the identified placement; and automatically apply a monitoring profile to each of the managed entities.

* * * * *